H. ELBE.
CHRISTMAS TREE HOLDER.
APPLICATION FILED SEPT. 8, 1916.

1,233,207.

Patented July 10, 1917.

WITNESSES

INVENTOR
H. Elbe
BY
ATTORNEYS

UNITED STATES PATENT OFFICE.

HENRY ELBE, OF BROOKLYN, NEW YORK.

CHRISTMAS-TREE HOLDER.

1,233,207.   Specification of Letters Patent.   Patented July 10, 1917.

Application filed September 8, 1916. Serial No. 119,010.

*To all whom it may concern:*

Be it known that I, HENRY ELBE, a citizen of the United States, and a resident of the city of New York, borough of Brooklyn, in the county of Queens and State of New York, have invented a new and Improved Christmas-Tree Holder, of which the following is a full, clear, and exact description.

My invention relates to Christmas tree holders characterized by means for rotatably supporting the tree.

An object of the invention is to provide an efficient support in which the grip on the tree trunk by the support is proportional to the weight of the tree supported.

Another object of the invention is to provide a support with which tree trunks of different sizes can be used without any necessity of adjustment in the support and in which support the friction caused by the weight of the tree is reduced to a minimum.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1:
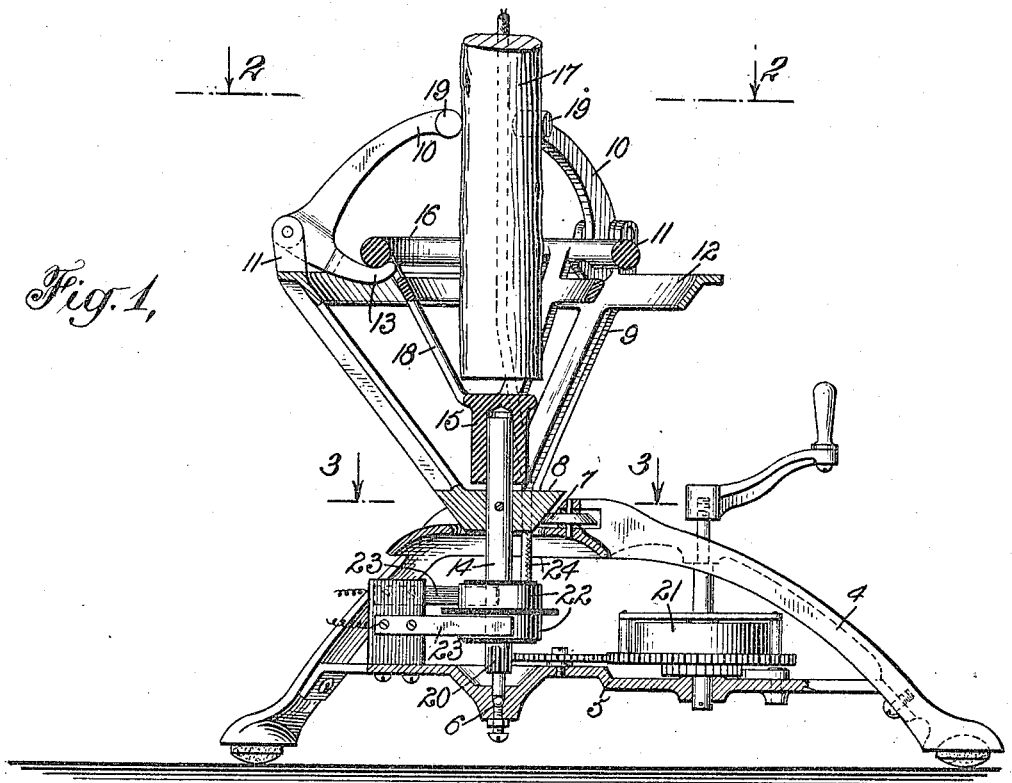
Figure 1 is a vertical section through a support embodying my invention.
Figures 2, 3:
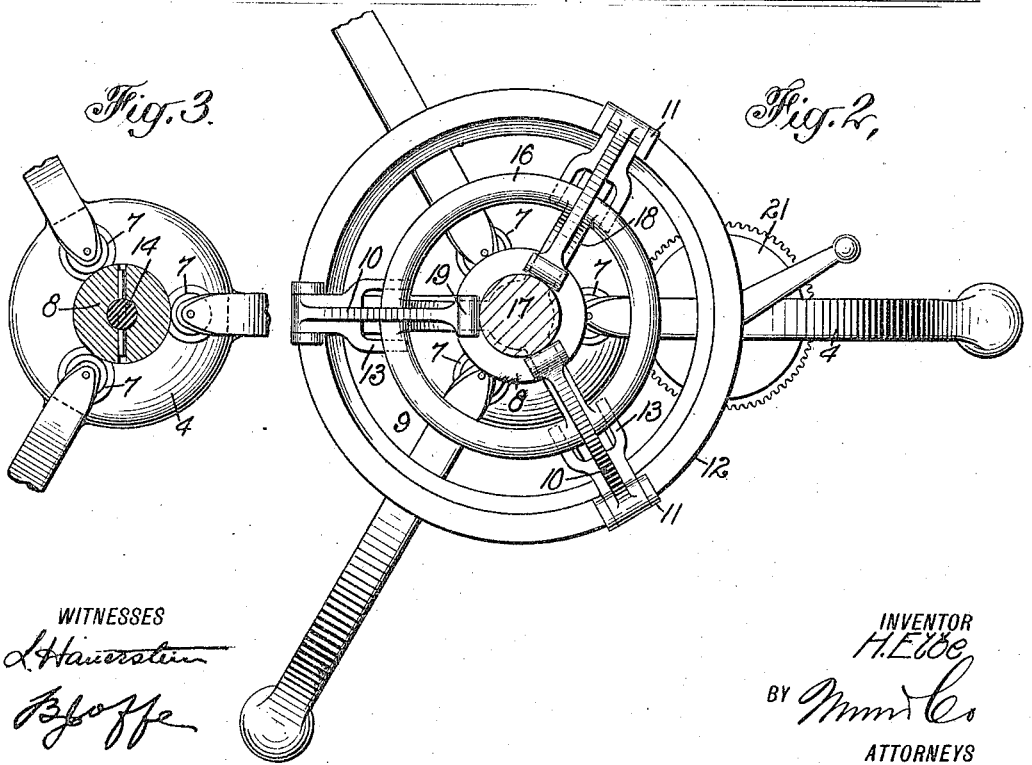
Fig. 2 is a plan view thereof shown as a section on line 2—2 in Fig. 1.
Fig. 3 is a fragmentary horizontal section on line 3—3, Fig. 1.

Referring to the drawings, the main support 4 is in the shape of a tripod braced at a short distance below the top by a bed 5. The bed carries a thrust bearing 6 which is co-axial with a roller bearing 7 formed of a plurality of rollers provided on the top of the tripod near the opening thereof. A frustocone-shaped member 8 engages the roller bearing 7 so that gravity tends to take up any wear between the member and the roller bearing. Said member 8 constitutes the lower part of a carrier 9 which is in the shape of a conical spider, larger at the upper end, and whereat gripping arms 10 are provided. Said gripping arms are pivotally connected to lugs 11 which rise from the rim 12 of the spider. Each of the arms 10 has an inwardly directed bifurcated finger 13 forming an integral part of the arm.

The carrier 9 has a spindle projecting above and below the portion 8 of the carrier and in rigid connection therewith. The lower end of the spindle engages the thrust bearing 6. The upper end of the spindle is engaged by a socket 15 which is free to move axially and revolve on said end of spindle. Said socket 15 forms an integral part of a rim 16 which rests on the fingers 13 of the arms 10. When the trunk 17 of a tree is placed between the arms 10 with the extremity of the trunk bearing on to the arms 18 which connect the rim 16 to the socket 15, the weight of the tree is transmitted through the rim to the arms 10, causing the gripping ends 19 of said arms to engage the trunk. The greater the weight of the tree the stronger will be the grip of the arms on the trunk. The socket 15, the rim 16, and the arms 18 constitute the tree socket, the gripping arms 10 preventing the tree from moving in the socket, and also centering the tree in said socket.

The spindle 14 has a pinion 20 which is geared to a motor 21, preferably mounted on the bed, and which may be a spring motor, as shown, or any other convenient motor which may be suitable for the purpose of transmitting rotary movement to the spindle. Mounted on the spindle 14 are two rings 22 insulated from each other and from the spindle. Brushes 23 are mounted on the bed 5, one for each ring, the two brushes being connected to a suitable source of electrical supply, not shown. The wires from the rings are merged in a cable 24 which is drawn through the spider, along the trunk and up into the tree. The connection of the cable with the rings is such that it does not interfere with the movement of the spindle. Although the holder is intended for trees, it can be used for staffs or any other supports presenting a trunk section.

While I have described the principle of operation, together with the device which I now consider to be the best embodiment thereof, I desire to have it understood that the device shown is merely illustrative and that such changes may be made as are within the scope of the appended claims.

I claim:

1. In a holder of the class described, a support, a carrier rotatably mounted thereon, means for rotating the carrier, clamping arms mounted pivotally on the carrier, said arms presenting inwardly-directed fingers, and a tree socket suspended from said fingers and in engagement with said carrier for steadying said socket on the fingers.

2. In a holder of the class described, a support, a carrier revolubly mounted on the support, means for revolving the carrier, clamping arms pivotally mounted on the carrier, inwardly-directed fingers from said arms, a tree socket suspended from said fingers, means for centering the socket with the carrier, said socket having an axial movement with said centering means whereby trees of various thicknesses may be clamped between the arms.

3. A holder of the class described, comprising a support, a carrier in the shape of an inverted conical spider rotatably mounted on the support, a thrust bearing for said carrier for steadying it in the support, means for rotating said carrier, clamping arms on the carrier, and a tree socket suspended from the clamping arms and engaging the carrier to be steadied on the arms, said socket being adapted to move the arms toward each other when weight is appiled to the socket.

4. A holder of the class described, comprising a support, a carrier in the shape of an inverted conical spider, roller bearings for said spider on the support nearer the vertex thereof, a spindle coaxial with the spider and constrained to rotate therewith extending into the support and spider, a thrust bearing for said spindle in the support, means for rotating the spindle whereby the carrier is rotated, gripping arms pivotally mounted at the base of the carrier, inwardly-directed fingers from said arms, and a tree socket in the shape of an inverted conical spider presenting a rim at the base thereof for engaging the fingers, said tree socket engaging the spindle portion projecting into the carrier, whereby said tree socket is steadied on the fingers, said arms being so related to the fingers that weight applied to the socket causes the arms to move toward each other.

HENRY ELBE.

Copies of this patent may be obtained for five cents each, by addressing the "Commissioner of Patents, Washington, D. C."